(12) United States Patent
Pechtold

(10) Patent No.: US 7,195,035 B2
(45) Date of Patent: Mar. 27, 2007

(54) IN-TANK HYDROGEN DISTRIBUTION VALVE

(75) Inventor: Rainer Pechtold, Russelsheim (DE)

(73) Assignee: GM Global Technology Operations, Inc., Detroit, MI (US)

(*) Notice: Subject to any disclaimer, the term of this patent is extended or adjusted under 35 U.S.C. 154(b) by 66 days.

(21) Appl. No.: 11/069,191

(22) Filed: Mar. 1, 2005

(65) Prior Publication Data

US 2006/0196565 A1    Sep. 7, 2006

(51) Int. Cl.
*F16K 11/044* (2006.01)

(52) U.S. Cl. .......... 137/625.44; 137/206; 123/DIG. 12; 429/34

(58) Field of Classification Search ............... 137/206, 137/209, 625.44; 251/12, 25; 123/525, 123/DIG. 12; 429/14, 34
See application file for complete search history.

(56) References Cited

U.S. PATENT DOCUMENTS

| 4,463,735 A | * | 8/1984 | Stoltman | 123/525 |
| 6,953,028 B2 | * | 10/2005 | Bingham et al. | 123/527 |

* cited by examiner

*Primary Examiner*—John Fox
(74) *Attorney, Agent, or Firm*—Charles H. Ellerbrock

(57) ABSTRACT

A hydrogen distribution valve for alternately distributing gaseous and liquid hydrogen from a tank is disclosed. The hydrogen distribution valve includes a valve housing having a gaseous hydrogen inlet, a liquid hydrogen inlet, a hydrogen outlet and a reference pressure port for receiving a reference hydrogen pressure. A rocker valve is provided in the valve housing for alternately sealing the gaseous hydrogen inlet and the liquid hydrogen inlet. A bias mechanism engages the rocker valve for biasing the rocker valve in sealing engagement with said liquid hydrogen inlet. A valve membrane is provided in fluid communication with the reference pressure port and engages the valve head for biasing the valve head in sealing engagement with the gaseous hydrogen inlet.

17 Claims, 3 Drawing Sheets

IN-TANK HYDROGEN DISTRIBUTION VALVE

FIELD OF THE INVENTION

The present invention relates to systems for distributing liquid or gaseous hydrogen from a hydrogen storage tank to a fuel cell or other destination for use. More particularly, the present invention relates to an in-tank hydrogen distribution valve which facilitates the automatic flow of gaseous hydrogen from a hydrogen storage tank to a fuel cell or other destination under low flow rates and/or high tank pressures and flow of liquid hydrogen under high flow rates and/or low tank pressures.

BACKGROUND OF THE INVENTION

Hydrogen is commonly used in various industrial applications. For example, in a fuel cell, hydrogen gas is used as a fuel to generate electrical power which operates a vehicle or other machinery. The hydrogen is typically stored in liquid form in a hydrogen tank and distributed from the tank to the fuel cell for use.

In liquid hydrogen tanks, the hydrogen typically exists in both a liquid portion and a gaseous portion. The temperature is maintained at a very low temperature (typically about −250° C.). The hydrogen may typically be distributed from the tank for use in a fuel cell, for example, in either gas or liquid form. Although some systems provide for the distribution of exclusively liquid or gaseous hydrogen from the tank, it may be desirable to shift between distributing either gaseous or liquid hydrogen from the tank depending on the tank conditions.

During the distribution of gaseous hydrogen from the tank, the pressure in the tank has a tendency to decrease at such a high rate that flow of hydrogen from the tank stalls. This phenomenon has been solved by providing a heater in thermal contact with the tank. In that case, heat transferred into the tank from the heater evaporates some of the liquid hydrogen into the gaseous phase, thereby increasing the tank pressure. Adding a heater to the tank, however, imparts additional complexity to the system.

During the distribution of liquid hydrogen from the tank, the tank pressure has a tendency to remain more stable than is the case with respect to gaseous hydrogen. Natural transfer of heat from extraneous heat sources into the tank, however, has a tendency to raise the temperature of the hydrogen in the tank. If the flow rate of liquid hydrogen from the tank is low, the raised temperature can lead to excessively high pressure levels in the tank.

Therefore, it is desirable to distribute liquid hydrogen from a hydrogen storage tank at high flow rates and/or low tank pressures and to distribute gaseous hydrogen from the tank at low flow rates and/or high tank pressures.

SUMMARY OF THE INVENTION

The present invention is generally directed to a novel hydrogen distribution valve which is capable of automatically distributing gaseous hydrogen from a hydrogen storage tank under low hydrogen flow rate and high tank pressure conditions and liquid hydrogen from the tank under high hydrogen flow rate and low tank pressure conditions. The hydrogen distribution valve includes a valve housing which is typically provided in the interior of the hydrogen storage tank. The valve housing includes a gaseous hydrogen inlet and a liquid hydrogen inlet. A valve arm having a valve head is pivotally mounted in the valve housing. Valve pins extend from opposite sides of the valve head to alternatively seal the gaseous hydrogen inlet or the liquid hydrogen inlet depending on the position of the valve head in the valve housing. A valve spring in the housing biases the valve arm such that the corresponding valve pin seals the liquid hydrogen inlet. A valve membrane, which engages the valve arm opposite the valve spring, is subjected to a selected hydrogen reference pressure on one side to bias the valve arm such that the corresponding valve pin seals the gaseous hydrogen inlet. A second pressure, which corresponds to the tank pressure minus the pressure drop across the valve, exerts pressure against the opposite side of the membrane. The pressure drop across the valve is determined by the flow rate of hydrogen from the tank.

Under conditions of increasing pressure in or low hydrogen flow rates from the tank, the pressure exerted by the valve spring, in combination with the tank pressure minus the pressure difference across the valve (which is exerted against one surface of the valve membrane), counteracts the bias pressure exerted by the reference pressure against the other surface of the valve membrane against the valve arm. This facilitates the flow of gaseous hydrogen from the tank, through the gaseous hydrogen inlet and into and then out of the valve housing, respectively. Under conditions of decreasing pressure in or high hydrogen flow rates from the tank, the pressure exerted by the valve membrane against the valve arm responsive to the hydrogen reference pressure against one surface of the valve membrane, counteracts the bias pressure exerted by the valve spring against the valve arm in combination with the tank pressure minus pressure drop across the valve as applied against the opposite surface of the valve membrane. Therefore, the valve head seals the gaseous hydrogen inlet and unseals the light hydrogen inlet. This facilitates the flow of liquid hydrogen from the tank, through the liquid hydrogen inlet and into and then out of the valve housing, respectively.

BRIEF DESCRIPTION OF THE DRAWINGS

The invention will now be described, by way of example, with reference to the accompanying drawings, in which.

DETAILED DESCRIPTION OF THE INVENTION

Figure 1:
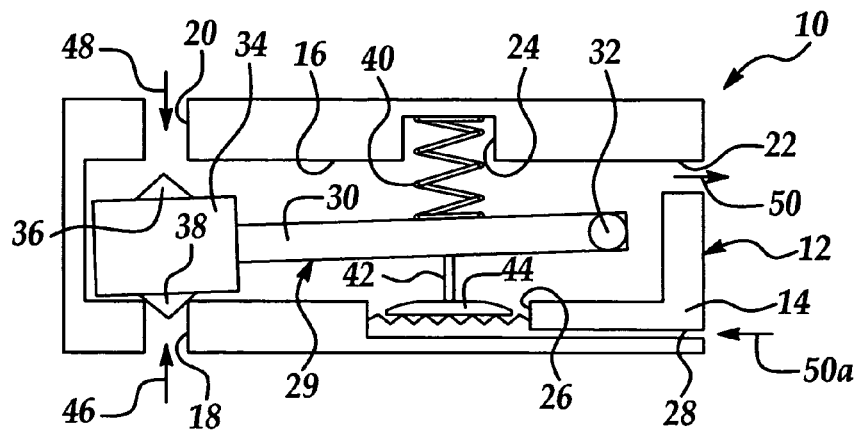
FIG. 1 is a cross-section of an illustrative embodiment of a hydrogen distribution valve according to the present invention, with the liquid hydrogen inlet closed and the gaseous hydrogen inlet open to allow the flow of gaseous hydrogen into and through the valve housing.
Figure 2:
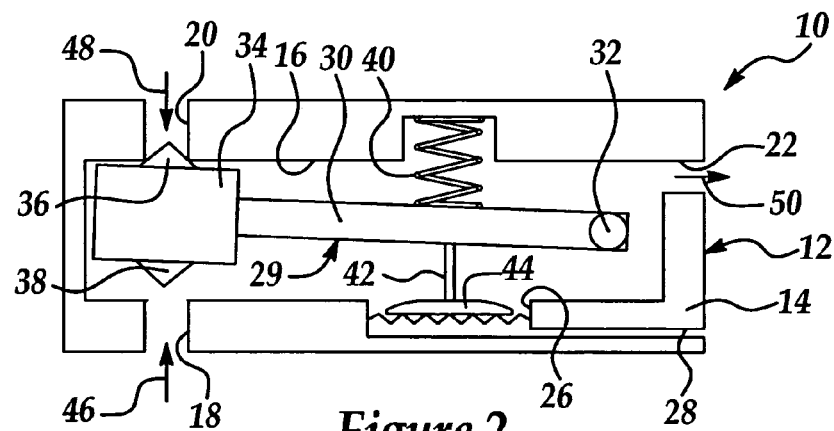
FIG. 2 is a cross-section of the hydrogen distribution valve, with the gaseous hydrogen inlet closed and the liquid hydrogen inlet open to allow the flow of liquid hydrogen into and through the valve housing.

Referring initially to FIGS. 1 and 2, an illustrative embodiment of the hydrogen distribution valve, hereinafter valve, of the present invention is generally indicated by reference numeral 10. The valve 10 includes a typically elongated valve housing 12 having a housing wall 14 which defines a housing interior 16. Adjacent to one end of the valve housing 12, a liquid hydrogen inlet 18 typically extends through the bottom portion of the housing wall 14 and communicates with the housing interior 16. A gaseous hydrogen inlet 20 likewise extends through the housing wall 14, opposite the liquid hydrogen inlet 18. A hydrogen outlet 22 extends through the housing wall 14, at the opposite end of the valve housing 12.

A spring seat 24 is provided in the interior surface of the housing wall 14, typically between the gaseous hydrogen inlet 20 and the hydrogen outlet 22. A coiled valve spring 40 is seated in the spring seat 24 and extends into the housing interior 16 for purposes which will be hereinafter described. A membrane seat 26 is provided in the interior surface of the housing wall 14, in spaced-apart relationship to the liquid hydrogen inlet 18 and opposite the spring seat 24. A resilient valve membrane 44, which may be a bellow (made out of steel), for example, is attached to the housing wall 14 and contained in the membrane seat 26. A reference pressure port 28 extends through the housing wall 14 and communicates with the membrane seat 26 for purposes which will be hereinafter described. Accordingly, the valve membrane 44 provides a fluid-tight barrier between the housing interior 16 and the reference pressure port 28.

A rocker valve 29 provided in the housing interior 16 includes an elongated valve arm 30 which is pivotally mounted in the housing interior 16 by means of a pivot pin 32. The pivot pin 32 typically extends through an opening (not shown) at one end of the valve arm 30 and engages the housing wall 14 adjacent to the hydrogen outlet 22. The valve spring 40, seated in the spring seat 24, engages one side of the valve arm 30. A membrane shaft 42 engages the opposite side of the valve arm 30 and is engaged by the valve membrane 44.

A valve head 34 of the rocker valve 29 is provided on the end of the valve arm 30 which is opposite the pivot pin 32. A valve pin 36 extends from one surface of the valve head 34 for removably engaging and sealing the gaseous hydrogen inlet 20. A valve pin 38 extends from the opposite surface of the valve head 34 for removably engaging and sealing the liquid hydrogen inlet 18.

Figure 3:
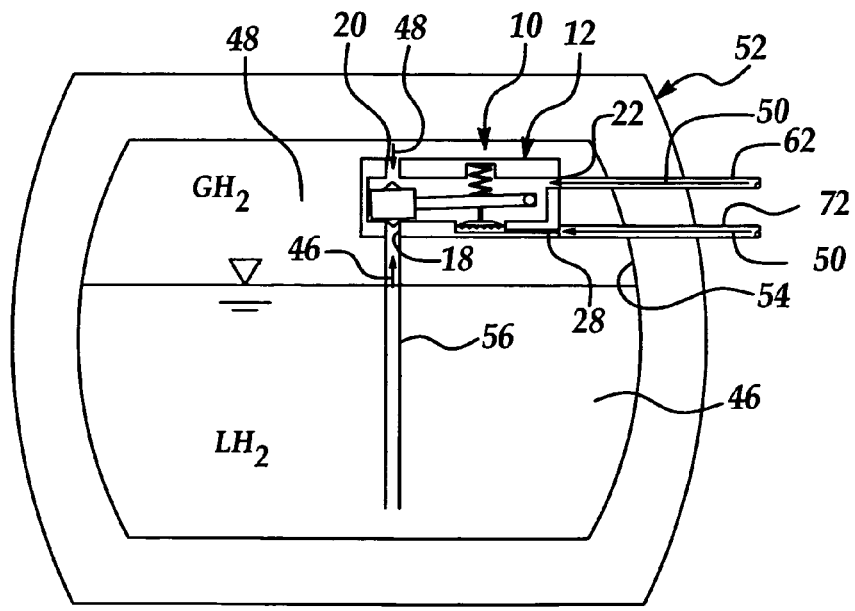
FIG. 3 is a schematic view of a hydrogen storage tank, with the hydrogen distribution valve provided inside the tank and illustrating flow of gaseous hydrogen from the tank and into the gaseous hydrogen inlet.

Referring next to FIG. 3, the valve 10 may be mounted in the tank interior 54 of a hydrogen storage tank 52. The tank interior 54 is designed to contain a supply of liquid hydrogen 46 in the bottom portion and gaseous hydrogen 48 in the upper portion thereof. The gaseous hydrogen 48 is separated from the liquid hydrogen 46. Preferably, the valve 10 is mounted in the upper portion of the tank interior 54.

A liquid hydrogen inlet conduit 56 typically extends from the liquid hydrogen inlet 18 of the valve housing 12 and downwardly into the bottom portion of the hydrogen storage tank 52. A hydrogen outlet conduit 62 extends from the hydrogen outlet 22 of the valve housing 12 and from the hydrogen storage tank 52 to carry gaseous or liquid outlet hydrogen 50 to a fuel cell stack (not shown), for example, or other destination for use. A reference pressure conduit 72 extends from the reference pressure port 28 of the valve housing 12 and from the hydrogen storage tank 52 to carry reference pressure hydrogen 50a having pressure of a constant magnitude to the reference pressure port 28, as will be hereinafter further described.

In operation, the valve 10 alternately permits flow of the gaseous hydrogen.48 and the liquid hydrogen 46 through the valve 10 and from the hydrogen storage tank 52 through the hydrogen outlet conduit 62, respectively. The hydrogen outlet conduit 62 carries the gaseous hydrogen 48 or liquid hydrogen 46 to a fuel cell stack (not shown) or other destination for use. The position of the valve head 34 in the housing interior 16, and thus, the flow of either gaseous hydrogen 48 or liquid hydrogen 46 into and through the housing interior 16 and from the hydrogen storage tank 52, depends on the pressure of the gaseous hydrogen 48 in the tank interior 54. This, in turn, determines the magnitude of pressure drop across the valve 10, and thus, the flow rate of hydrogen through the valve 10 and from the hydrogen storage tank 52. Therefore, the pressure which is exerted on the valve membrane 44 inside the housing interior 16 and which counteracts the reference pressure 50a on the opposite side of the membrane 44 corresponds to the pressure inside the tank interior 54 minus the pressure drop across the valve 10 (or the pressure difference between the liquid hydrogen inlet 18 or gaseous hydrogen inlet 20 and the hydrogen outlet 22.

Under conditions of rapidly decreasing pressure in the tank interior 54 and high rates of hydrogen flow from the hydrogen tank 52, the valve spring 40 initially biases the valve arm 30 in the lower position shown in FIG. 1. This biasing pressure of the valve spring 40, in combination with the pressure against the valve membrane 44 inside the housing interior 16 (which corresponds to the pressure in the tank interior 54 minus the pressure drop across the valve 10), exceeds and counteracts the upward force of the reference pressure hydrogen 50a against the valve arm 30 through the valve membrane 44. Therefore, the valve pin 36 is retracted from the gaseous hydrogen inlet 20 and the valve pin 38 engages and seals the liquid hydrogen inlet 18. This allows gaseous hydrogen 48 to flow from the tank interior 54, through the unblocked gaseous hydrogen inlet 20 and housing interior 16, respectively, and from the valve housing 12 through the hydrogen outlet 22 and hydrogen outlet conduit 62 as outlet hydrogen 50. The hydrogen outlet conduit 62 distributes the outlet hydrogen 50 to a fuel cell (not shown) or other destination for use.

As the gaseous hydrogen 48 flows from the tank interior 54, through the gaseous hydrogen inlet 20 and housing interior 16, respectively, the pressure inside the tank interior 54 is progressively reduced. For a period of time, however, the pressure inside the tank interior 54 minus the pressure drop across the valve 10 remains sufficiently high such that the downward force which results from this pressure and the valve spring 40 against the valve arm 30 overcomes the upward force imparted against the valve arm 30 by the valve membrane 44 due to the constant reference pressure hydrogen 50a. Therefore, when the pressure inside the tank interior 54 and the flow rate of hydrogen from the tank interior 54 fall below a certain level, the pressure which is the interior tank pressure minus the pressure drop across the valve 10 and is applied against the valve membrane 44 in the housing interior 16, in combination with the downward force exerted on the valve arm 30 by the valve spring 40, is insufficient to overcome the upward bias exerted against the valve arm 30 by the reference pressure hydrogen 50a through the valve membrane 44. Therefore, through the membrane shaft 42, the valve membrane 44 pivots the valve arm 30 on the pivot pin 32 to the upward position of FIG. 2, such that the valve pin 38 is retracted from the liquid hydrogen inlet 18 and the valve pin 36 simultaneously engages and seals the gaseous hydrogen inlet 20. Consequently, further flow of gaseous hydrogen 48 into the housing interior 16 through the gaseous hydrogen inlet 20 is blocked while flow of liquid hydrogen 46 into the housing interior 16 through the liquid hydrogen inlet 18 is allowed. The liquid hydrogen 46 flows from the housing interior 16 through the hydrogen outlet 22 as outlet hydrogen 50. The hydrogen outlet conduit 62 distributes the outlet hydrogen 50 to the fuel cell stack (not shown) or other destination for use.

As the liquid hydrogen 46 flows from the tank interior 54 through the valve 10, the pressure of the gaseous hydrogen 48 in the tank interior 54 steadily rises. Consequently, the tank pressure minus the pressure drop across the valve 10 (as applied against the valve membrane 44 in the housing interior 16), in combination with the downward force of the valve spring 40 against the valve arm 30, eventually overcomes the upward pressure exerted on the valve arm 30 by the reference hydrogen pressure 50a through the valve membrane 44. Therefore, the valve arm 30 pivots on the pivot pin 32 from the upper position of FIG. 2 to the lower position of FIG. 1. Accordingly, the valve pin 38 engages and seals the liquid hydrogen inlet 18 to prevent further flow of liquid hydrogen 46 through the valve 10. Simultaneously, the valve pin 36 is retracted from the gaseous hydrogen inlet 20, thereby enabling gaseous hydrogen 48 to resume flow from the tank interior 54 and through the valve 10 and hydrogen outlet 62, respectively.

The transition point between the position of the valve head 34 in which the valve pin 36 seals the gaseous hydrogen inlet 20 and the position in which the valve pin 38 seals the liquid hydrogen inlet 18 depends mainly on the pressure inside the tank interior 54. However, the relevant pressure is the pressure at the valve-membrane 44 inside the housing interior 16 of the valve 10. This corresponds to the pressure inside the tank interior 54 minus the pressure drop across the valve 10. This pressure drop, in turn, depends on the rate of hydrogen flow through the valve 10. This determines the transition between the position of the valve head 34 in which gaseous hydrogen 48 is allowed to enter the housing interior 16 and the position in which liquid hydrogen 46 is allowed to enter the housing interior 16. Therefore, the switching point of the rocker valve 29 depends on the rate of flow of hydrogen through the valve 10.

As an example, at very low hydrogen flow rates, the transition from gaseous hydrogen to liquid hydrogen may occur at a pressure in the tank interior 54 of 6 bar and a pressure drop across the valve 10 of 0.2 bar. The pressure exerted against the valve membrane 44 in the housing interior 16 would therefore be 5.8 bar at the transition point. At a higher hydrogen flow rate, the pressure drop across the valve 10 may increase to 0.8 bar. In that case, the rocker valve 29 would transition when the pressure inside the tank interior 54 is 6.6 bar and the pressure exerted against the valve membrane 44 in the housing interior 16 is 5.8 bar.

During flow of gaseous hydrogen 48 through the valve 10, the hydrogen pressure in the tank interior 54, and thus, the pressure drop across the valve 10 and the hydrogen flow rate, is initially relatively high and steadily decreases. It is at this point (high hydrogen flow rate, low hydrogen pressure) that the pressure of the hydrogen in the tank interior 54 decreases to the point at which the gaseous hydrogen inlet 20 is closed and the liquid hydrogen inlet 18 is opened to allow the flow of the liquid hydrogen 46 through the valve 10. Conversely, during flow of liquid hydrogen 46 through the valve 10, the hydrogen pressure in the tank interior 54, and thus, the pressure drop across the valve 10 and the hydrogen flow rate, is relatively low. The pressure of the gaseous hydrogen 48 in the tank interior 54 steadily increases. At this point (low hydrogen flow rate, high hydrogen pressure), the transition is made from flow of the liquid hydrogen 46 to flow of the gaseous hydrogen 48 through the valve 10 to resume a high flow rate of the gaseous hydrogen from the tank interior 54.

Figure 4:
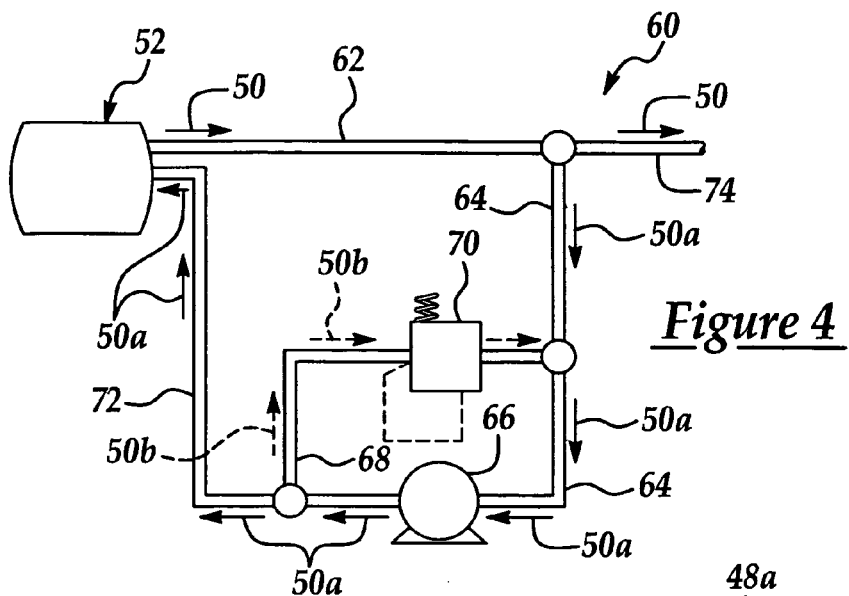
FIG. 4 is a schematic view of an illustrative reference pressure generating system which is suitable for use in conjunction with the hydrogen distribution valve of the present invention.

Referring next to FIG. 4, an illustrative reference pressure generator system 60 which is suitable for use in conjunction with the valve 10 is shown. The reference pressure generator system 60 includes a hydrogen shunt conduit 64 which extends from the hydrogen outlet conduit 62. A fuel cell stack inlet conduit 74 may extend beyond the hydrogen outlet conduit 62 to distribute outlet hydrogen 50 to a fuel cell stack (not shown) in a fuel cell vehicle, for example. A pump 66 is provided in the hydrogen shunt conduit 64. An overpressure conduit 68 extends from the hydrogen shunt conduit 64 downstream of the pump 66 and re-enters the hydrogen shunt conduit 64 upstream of the pump 66. An overpressure valve 70 is provided in the overpressure conduit 68. The reference pressure conduit 72 extends from the hydrogen shunt conduit 64, beyond the branch point of the overpressure conduit 68. The reference pressure conduit 72 enters the tank interior 54 of the hydrogen storage tank 52 and is disposed in fluid communication with the reference pressure port 28 of the valve 10, as shown in FIG. 3.

During operation of the valve 10 as heretofore described with respect to FIGS. 1–3, the pump 66 compresses reference pressure hydrogen 50a in the hydrogen shunt conduit 64 to a selected pressure which is greater than the pressure of the outlet hydrogen 50 flowing through the hydrogen outlet conduit 62. The reference pressure hydrogen 50a flows through the reference pressure conduit 72 and enters the reference pressure port 28 (FIGS. 1–3) of the valve 10, where the reference pressure hydrogen 50a exerts the selected constant preset pressure against the valve diaphragm 44; The overpressure valve 70 in the overpressure conduit 68 maintains the pressure of the reference pressure hydrogen 50a at the selected present pressure value. Hydrogen 50b in the overpressure conduit 68 may be vented into the hydrogen shunt conduit 64.

Figure 5:
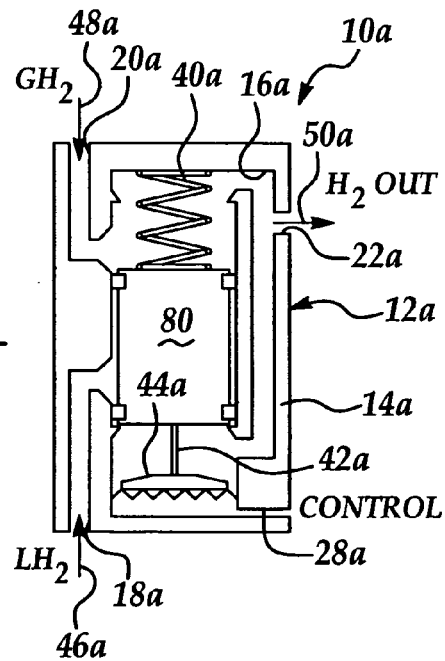
FIG. 5 is a cross-section of another embodiment of the hydrogen distribution valve, with the liquid hydrogen inlet closed and the gaseous hydrogen inlet open to allow the flow of gaseous hydrogen into and through the valve housing.
Figure 6:
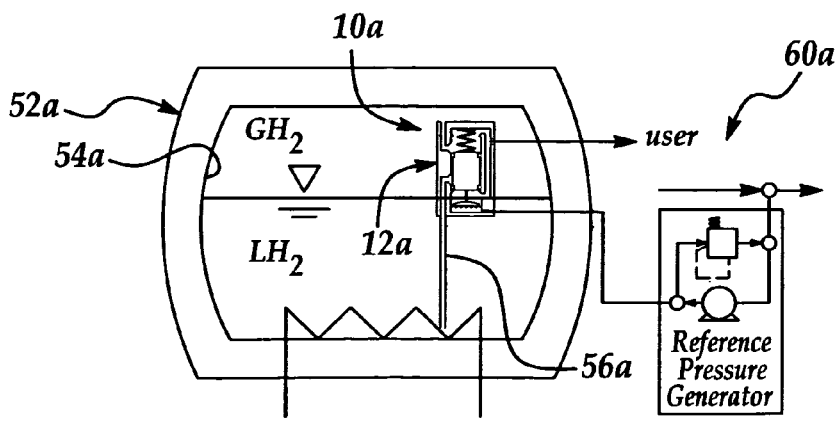
FIG. 6 is a schematic view of a hydrogen storage tank, with the hydrogen distribution valve of FIG. 5 provided inside the tank.

Referring next to FIGS. 5 and 6, another embodiment of the in-tank hydrogen distribution valve of the present invention is generally indicated by reference numeral 10a. The hydrogen distribution valve 10a includes a valve housing 12a having a housing wall 14a which defines a housing interior 16a. A liquid hydrogen inlet 18a, a gaseous hydrogen inlet 20a and a hydrogen outlet 22a are provided in the housing wall 14a. A piston 80 is slidably mounted in the housing interior 16a for reciprocation therein. Accordingly, the piston 80 is positional in a lower position, as shown, in which the piston 80 blocks communication between the liquid hydrogen inlet 18a and the hydrogen outlet 22a and simultaneously establishes communication between the gaseous hydrogen inlet 20a and the hydrogen outlet 22. Alternatively, the piston 80 is positional in an upper position (not shown) in which the piston 80 blocks communication between the gaseous hydrogen inlet 20a and the hydrogen outlet 22a and simultaneously establishes communication between the liquid hydrogen inlet 18a and the hydrogen outlet 22a. A reference pressure port 28a, which is connected to a reference pressure generator system 60a (FIG. 6), is provided in fluid communication with the housing interior 16a, beneath the piston 80.

A valve spring 40a normally biases the piston 80 in the lower position in the housing interior 16 such that the piston 80 simultaneously blocks communication between the liquid hydrogen inlet 18a and the hydrogen outlet 22a and establishes communication between the gaseous hydrogen inlet 20a and the hydrogen outlet 22a. A valve membrane 44a is mounted in the housing interior 16a and is subjected to pressure from the reference pressure generator 60a via the reference pressure port 28a. The valve membrane 44a is connected to the piston 80 through a membrane shaft 42a. Accordingly, the reference pressure applied by the reference pressure generator 60a against the valve membrane 44a at the reference pressure port 28a exerts pressure upwardly against the piston 80 via the membrane shaft 42a.

The in-tank hydrogen distribution valve 10a operates in the same manner as the in-tank hydrogen distribution valve 10 heretofore described with respect to FIGS. 1–3, with the piston 80 of the valve 10a functionally analogous to the rocker valve 29 of the valve 10. Therefore, during periods of low flow rates of hydrogen from the hydrogen storage tank 52a and increasing pressures in the hydrogen storage tank 52a, the piston 80 is biased by the valve spring 40a in the downward position, against the upward pressure exerted on the piston 80 by the reference pressure against the valve membrane 44a. This facilitates the flow of gaseous hydrogen 48a from the tank interior 54a (FIG. 6) and through the housing interior 16a and hydrogen outlet 22a, respectively, of the valve 10a, while blocking the flow of liquid hydrogen 46a from the tank interior 54a. Conversely, during periods of high flow rates of hydrogen from the hydrogen storage tank 52a and decreasing pressures in the hydrogen storage tank 52a, the piston 80 is biased by the reference pressure via the valve membrane 44a in the upper position, against the valve spring 40a. This facilitates the flow of liquid hydrogen 46a from the tank interior 54a and through the housing interior 16a and hydrogen outlet 22a, respectively, of the valve 10a while blocking the flow of gaseous hydrogen 48a from the tank interior 54a.

Figure 7:
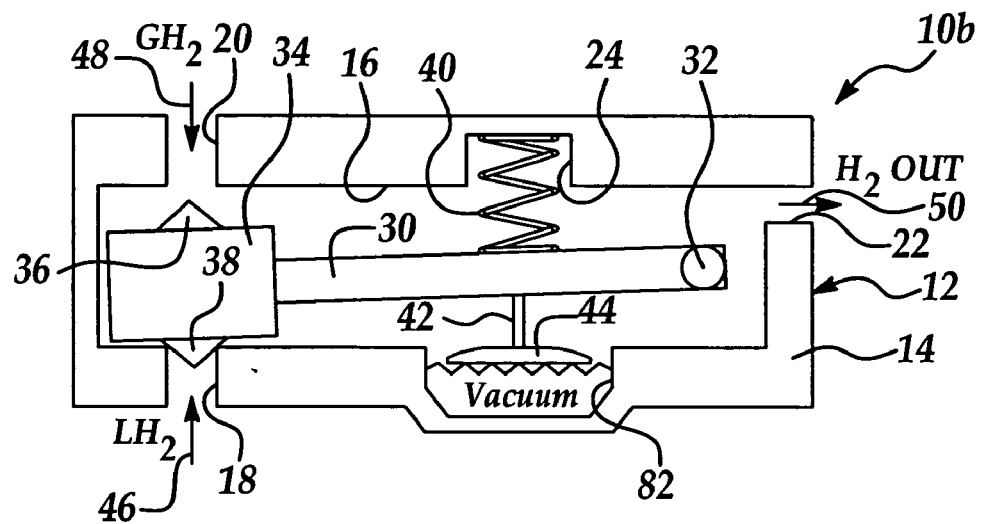
FIG. 7 is a cross-section of still another embodiment of the hydrogen distribution valve, with the liquid hydrogen inlet closed and the gaseous hydrogen inlet open to allow the flow of gaseous hydrogen into and through the valve housing.
Figure 8:
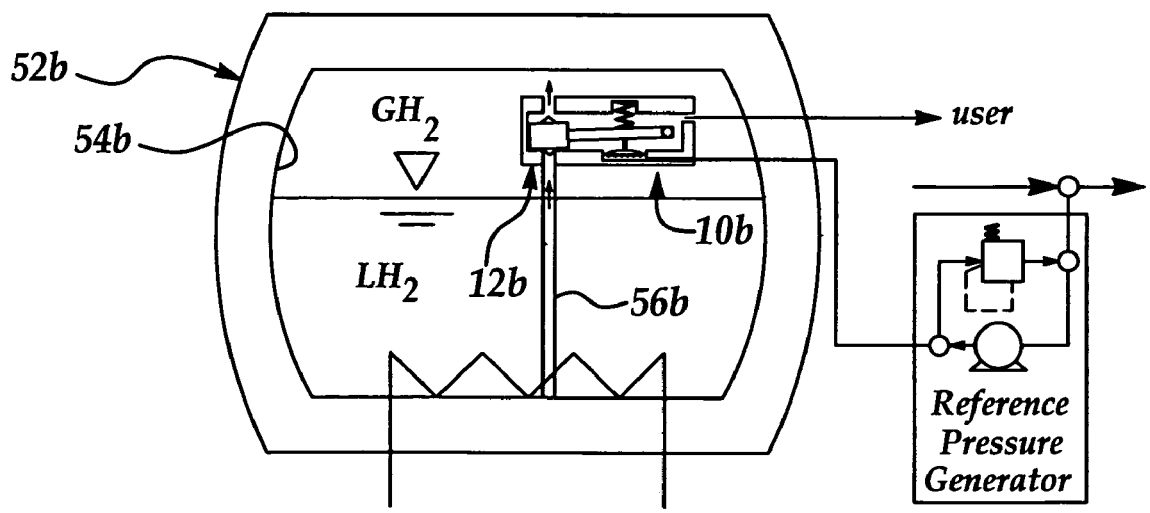
FIG. 8 is schematic view of a hydrogen storage tank, with the hydrogen distribution valve of FIG. 7 provided inside the tank.

Referring next to FIGS. 7 and 8, in still another embodiment of the invention, an in-tank hydrogen distribution valve 10b includes the same components as the in-tank hydrogen distribution valve 10 heretofore described with respect to FIGS. 1–3, except the reference pressure port 28 of the valve 10 of FIGS. 1–3 is omitted and the valve membrane 44 is mounted in a vacuum chamber 82. When the valve 10b is fabricated at room temperature, the vacuum chamber 82 is filled with air. After the valve 10b is mounted in the tank interior 54b of a hydrogen storage tank 54 (FIG. 8), the hydrogen storage tank 54 is cooled down to typically about –250 degrees Celsius. Accordingly, the air in the vacuum chamber 82 freezes, thereby forming a vacuum therein.

While the preferred embodiments of the invention have been described above, it will be recognized and understood that various modifications can be made to the invention and the appended claims are intended to cover all such modifications which may fall within the spirit and scope of the invention.

What is claimed is:

1. A hydrogen distribution valve comprising:
   a valve housing having a gaseous hydrogen inlet, a liquid hydrogen inlet, a hydrogen outlet and a reference pressure port for receiving a reference hydrogen pressure;
   a rocker valve provided in said valve housing for alternately sealing said gaseous hydrogen inlet and said liquid hydrogen inlet;
   a bias mechanism engaging said rocker valve for biasing said rocker valve in sealing engagement with one of said liquid hydrogen inlet or said gaseous hydrogen inlet; and
   a valve membrane provided in fluid communication with said reference pressure port and engaging said valve head for biasing said valve head in sealing engagement with one of said gaseous hydrogen inlet or said liquid hydrogen inlet.

2. The hydrogen distribution valve of claim 1 wherein said bias mechanism comprises a valve spring.

3. The hydrogen distribution valve of claim 1 wherein said rocker valve comprises an elongated valve arm pivotally mounted in said valve housing and a valve head carried by said valve arm for alternately sealing said gaseous hydrogen inlet and said liquid hydrogen inlet.

4. The hydrogen distribution valve of claim 3 further comprising a first valve pin carried by said valve head for removably engaging and sealing said gaseous hydrogen inlet and a second valve pin carried by said valve head for removably engaging and sealing said liquid hydrogen inlet.

5. The hydrogen distribution valve of claim 1 further comprising a membrane shaft carried by said valve membrane.

6. The hydrogen distribution valve of claim 1 further comprising a reference pressure generator system operably connected to said reference pressure port for generating a reference hydrogen pressure in said reference pressure port against said valve membrane.

7. The hydrogen distribution valve of claim 6 wherein said reference pressure generator comprises a pump for receiving a supply of hydrogen and provided in fluid communication with said reference pressure port for generating said reference hydrogen pressure and an overpressure valve provided in fluid communication with said pump for regulating said reference hydrogen pressure.

8. The hydrogen distribution valve of claim 7 wherein said hydrogen outlet is provided in fluid communication with said pump for distributing said supply of hydrogen to said pump.

9. A hydrogen distribution valve comprising:
   a valve housing having a gaseous hydrogen inlet and a liquid hydrogen inlet disposed in opposing relationship to each other adjacent to a first end of said housing, a hydrogen outlet provided at a second end of said housing and a reference pressure port adjacent to said hydrogen outlet for receiving a reference hydrogen pressure;
   a rocker valve provided in said valve housing for alternately sealing said gaseous hydrogen inlet and said liquid hydrogen inlet;
   a bias mechanism engaging said rocker valve for biasing said rocker valve in sealing engagement with one of said liquid hydrogen inlet or said gaseous hydrogen inlet; and
   a valve membrane provided in fluid communication with said reference pressure port and engaging said valve head for biasing said valve head in sealing engagement with one of said gaseous hydrogen inlet or said liquid hydrogen inlet.

10. The hydrogen distribution valve of claim 9 further comprising a spring seat provided in said valve housing and wherein said bias mechanism comprises a valve spring seated in said spring seat.

11. The hydrogen distribution valve of claim 10 further comprising a membrane seat provided in said valve housing opposite said spring seat and wherein said valve membrane is provided in said membrane seat.

12. The hydrogen distribution valve of claim 11 further comprising a rocker arm, a membrane shaft carried by said valve membrane and engaging said rocker arm.

13. The hydrogen distribution valve of claim 9 wherein said rocker valve comprises an elongated valve arm pivotally mounted in said valve housing and a valve head carried by said valve arm for alternately sealing said gaseous hydrogen inlet and said liquid hydrogen inlet, and wherein said bias mechanism engages said valve arm.

14. The hydrogen distribution valve of claim 13 further comprising a first valve pin carried by said valve head for removably engaging and sealing said gaseous hydrogen inlet and a second valve pin carried by said valve head for removably engaging and sealing said liquid hydrogen inlet.

15. The hydrogen distribution valve of claim 9 further comprising a reference pressure generator system operably connected to said reference pressure port for generating a reference hydrogen pressure in said reference pressure port against said valve membrane.

16. The hydrogen distribution valve of claim 15 wherein said reference pressure generator comprises a pump for receiving a supply of hydrogen and provided in fluid communication with said reference pressure port for generating said reference hydrogen pressure and an overpressure valve provided in fluid communication with said pump for regulating said reference hydrogen pressure.

17. The hydrogen distribution valve of claim 16 wherein said hydrogen outlet is provided in fluid communication with said pump for distributing said supply of hydrogen to said pump.

* * * * *